United States Patent
Igawa et al.

(10) Patent No.: US 10,566,141 B2
(45) Date of Patent: *Feb. 18, 2020

(54) SEPARATOR AND ALUMINUM ELECTROLYTIC CAPACITOR

(71) Applicant: NIPPON KODOSHI CORPORATION, Kochi-shi (JP)

(72) Inventors: Atsushi Igawa, Kochi (JP); Naoki Fujimoto, Kochi (JP); Akiyoshi Takeuchi, Kochi (JP); Norihiro Wada, Kochi (JP)

(73) Assignee: NIPPON KODOSHI CORPORATION, Kochi-shi (JP)

( * ) Notice: Subject to any disclaimer, the term of this patent is extended or adjusted under 35 U.S.C. 154(b) by 246 days.

This patent is subject to a terminal disclaimer.

(21) Appl. No.: 15/542,317

(22) PCT Filed: Jan. 5, 2016

(86) PCT No.: PCT/JP2016/050141
§ 371 (c)(1),
(2) Date: Jul. 7, 2017

(87) PCT Pub. No.: WO2016/114715
PCT Pub. Date: Jul. 21, 2016

(65) Prior Publication Data
US 2018/0315551 A1 Nov. 1, 2018

(30) Foreign Application Priority Data

Jan. 16, 2015 (JP) ................................ 2015-006664

(51) Int. Cl.
| | | |
|---|---|---|
| *H01G 9/02* | (2006.01) | |
| *H01G 11/52* | (2013.01) | |
| *H01M 2/16* | (2006.01) | |
| *H01G 9/045* | (2006.01) | |
| *H01M 10/052* | (2010.01) | |
| *H01M 10/05* | (2010.01) | |
| *H01M 10/0525* | (2010.01) | |

(52) U.S. Cl.
CPC .............. *H01G 9/02* (2013.01); *H01G 9/045* (2013.01); *H01G 11/52* (2013.01); *H01M 2/162* (2013.01); *H01M 2/1626* (2013.01); *H01M 10/05* (2013.01); *H01M 10/052* (2013.01); *H01M 10/0525* (2013.01); *Y02E 60/13* (2013.01)

(58) Field of Classification Search
CPC ....... H01G 9/045; H01G 11/52; H01M 2/162; H01M 2/1626
See application file for complete search history.

(56) References Cited

U.S. PATENT DOCUMENTS

| | | | |
|---|---|---|---|
| 6,042,769 A | 3/2000 | Gannon et al. | |
| 6,104,600 A * | 8/2000 | Suhara ..................... | H01G 9/02 361/502 |
| 6,258,304 B1 * | 7/2001 | Bahia ......................... | C08J 5/18 264/171.1 |
| 10,283,283 B2 * | 5/2019 | Ichimura ................... | H01G 9/02 |
| 2013/0149614 A1 * | 6/2013 | Kubo ................... | H01M 2/1626 429/246 |
| 2018/0047961 A1 * | 2/2018 | Igawa ...................... | H01G 9/02 |
| 2018/0261392 A1 * | 9/2018 | Ichimura .................. | H01G 9/02 |
| 2018/0274174 A1 * | 9/2018 | Tanaka .................... | D21H 27/00 |
| 2019/0048528 A1 * | 2/2019 | Watanabe ................ | B32B 5/24 |
| 2019/0106842 A1 * | 4/2019 | Kinnunen-Raudaskoski ............. | D21H 13/10 |

FOREIGN PATENT DOCUMENTS

| | | |
|---|---|---|
| JP | 53-142652 A | 12/1978 |
| JP | 5-267103 A | 10/1993 |
| JP | 6-168848 A | 6/1994 |
| JP | 10-504858 A | 5/1998 |
| JP | 2006-253728 A | 9/2006 |
| JP | 2009-158811 A | 7/2009 |
| JP | 2010-239094 A | 10/2010 |
| JP | 2012-221567 A | 11/2012 |
| JP | 2015-4140 A | 1/2015 |
| JP | 2015-88703 A | 5/2015 |
| RU | 1739403 A1 | 6/1992 |
| RU | 2 427 052 C1 | 8/2011 |

OTHER PUBLICATIONS

International Search Report dated Mar. 15, 2016, in PCT/JP2016/050141 filed Jan. 5, 2016.
Russian Office Action dated Mar. 20, 2019 in Russian Patent Application No. 2017128987/07 (with English translation), 11 pages.

* cited by examiner

*Primary Examiner* — Nathan Milakovich
(74) *Attorney, Agent, or Firm* — Oblon, McClelland, Maier & Neustadt, L.L.P.

(57) ABSTRACT

Provided is a separator having excellent tearing strength, denseness, and impedance performance, and an aluminum electrolytic capacitor provided with the separator. The present invention constitutes a separator including beatable regenerated cellulose fibers, the separator having a CSF value $X$[ml] and tear index $Y$[mN·m²/g] within the ranges satisfying the following formulae. The present invention also constitutes an aluminum electrolytic capacitor in which at least one of the separators is used, the capacitor feeing formed by interposing the separator between an anode and a cathode.

$0 \leq X \leq 300$            Formula 1

$15 \leq Y \leq 100$            Formula 2

$Y \geq 0.175X - 2.5$            Formula 3

6 Claims, 1 Drawing Sheet

SEPARATOR AND ALUMINUM ELECTROLYTIC CAPACITOR

TECHNICAL FIELD

The present invention relates to a separator that is suitable for an aluminum electrolytic capacitor, and an aluminum electrolytic capacitor using the separator.

BACKGROUND ART

Recently, along with electronization of automobile-related equipment and digital equipment, energy saving has advanced, and there is a demand for impedance reduction and lifetime elongation of parts to be mounted thereon. In addition, due to the impedance reduction of parts to be mounted thereon, there are attained many merits such as reduction in power loss, response to voltage reduction of semiconductor operating power and increase in operating speed, and enhancement of frequency characteristics.

Furthermore, due to an energy serving policy and an alternative energy policy to oil by not only Japan but also by every country in the world, the utilization of inverter circuits or the like each having good energy efficiency has been continuously expanded in every field related to environments such as wind power generation, solar cell, hybrid vehicle, electric vehicle, and various types of energy saving devices. Also in home appliances, a large number of equipment such as air conditioner, refrigerator, laundry machine and lighting equipment all of which are for saving energy include the invertor circuit.

In the invertor circuit, an aluminum electrolytic capacitor is used for smoothing of varied component included in a direct current that is output from a rectifier.

Since the aluminum electrolytic capacitor occupies a large volume ratio in the components of the invertor circuit, further miniaturization of the aluminum electrolytic capacitor is strongly demanded.

When a ripple current is applied to the aluminum electrolytic capacitor, the capacitor is self-heated due to loss of power. It is possible to suppress heat generation by the ripple current due to reduction in impedance of the aluminum electrolytic capacitor. The heat generation in the aluminum electrolytic capacitor is a factor that directly affects the lifetime, and since the reduction in the heat generation results in prolongation of the lifetime, the requirement for the impedance reduction becomes higher.

In general, an electrolytic capacitor such as an aluminum electrolytic capacitor is fabricated by interposing a separator between an anode aluminum foil and a cathode aluminum foil, winding these to thereby form a capacitor element, impregnating the capacitor element with an electrolytic solution, inserting into a case, and then sealing an opening.

It is known that the electrolytic solution and the separator give a large influence on the impedance of the aluminum electrolytic capacitor. Accordingly, in order to improve the impedance of the aluminum electrolytic capacitor, the reduction in the impedance of the electrolytic solution and the separator is highly required.

Furthermore, it is effective to stake the separator thin for down-sizing the aluminum electrolytic capacitor.

In a case of using aluminum foils having the same area, a capacitor element having a smaller outer diameter can be fabricated by the use of the capacitor element formed of the thinner separator. Therefore, a thin separator is required.

The main role of the separator in the aluminum electrolytic capacitor is isolation of the electrode foils and retaining of the electrolyte. Electrical insulation is required for the material of the separator, and hydrophilic properties and lipophilic properties are required for retaining various types of electrolytes. Therefore, there is used a separator made from cellulose having these properties at the same time.

Examples of the cellulose materials for the separator to be usually used include: a natural cellulose fiber such as a conifer craft pulp, a manila hemp pulp or an esparto pulp; and a regenerated cellulose fiber such as a solvent-spun cellulose fiber.

Effective techniques for reducing the impedance of the separator are to reduce the basis weight of the separator, to reduce the density, and to make the thickness thin.

However, there are caused various problems in mere reduction of the basis weight of the separator, reduction of the density, and making the thickness thin.

The denseness of the separator is also reduced by reduction of the basis weight of the separator, reduction of the density, and making the thickness thin, the denseness of the separator is also reduced. Accordingly, in case of the use in the aluminum electrolytic capacitor, there is a problem that an element short circuit defect rate and an aging short circuit defect rate are increased, and even if short-circuiting does not occur, the short circuit defect rates of products after coming onto the market are increased.

In addition, the value of tearing strength of the separator is also lowered, in a case of reducing the basis weight of the separator, reducing the density, and making the thickness thin. As a result, during the manufacturing step of the aluminum electrolytic capacitor, the separator is broken to lower productivity and yield.

For these reasons, even if the separator has a low basis weight, low density and is thin, the separator is required to have high denseness so as not to increase the short circuit defect rats and strength so as to avoid paper breaking in each step.

In order to enhance the denseness of the separator and to reduce the short circuit defect rate of the aluminum electrolytic capacitor, there have been known methods in which the thickness of the separator is made large, and a value of CSF (Canadian Standard Freeness) in accordance with JIS P 8121 which indicates a degree of beating of pulp being a raw material is made smaller, thereby enhancing the density.

However, when the thickness of the separator is made large and the density is increased, the impedance is worsened.

Furthermore, at the time of winding the aluminum electrolytic capacitor element, a stress is applied to the separator, the anode foil and the cathode foil mainly in the longitudinal direction. However, by shifting of the position of the separator from side to side on a transporting foil, there is a case where a stress of the separator is added also in the width direction. At that time, when the tearing strength of the separator is weak, there is a case where the separator is broken to lower the yield.

Therefore, the separator for the aluminum electrolytic capacitor is also required to have strong tearing strength.

As mentioned above, as to the separator for the aluminum electrolytic capacitor, there is required a thin separator having excellent impedance and being capable of improving short circuit defect rate and enhancing yield.

In the separator for the aluminum electrolytic capacitor, there have been proposed various configurations in order to enhance properties (for example, refer to Patent Literature 1 to Patent Literature 7).

CITATION LIST

Patent Literature

PTL 1: Japanese Patent Laid-Open No. G5-267103
PTL 2: Japanese Patent Laid-Open No. 2010-239094
PTL 3: Japanese Paten Laid Open No. 2009-158811
PTL 4: Japanese Patent Laid-Open No. 2006-253728
PTL 5: Japanese Patent Laid-Open No. 2012-221567
PTL 6: Japanese Patent Laid-Open No. 53-142652
PTL 7: Japanese Patent Laid-Open No. 06-168848

SUMMARY OF THE INVENTION

Technical Problem

In Patent Literature 1, in order to enhance the denseness of the separator and to improve the impedance performance, there is proposed a method of using a beaten solvent-spun cellulose fiber. The separator using the solvent-spun cellulose fiber having a high degree of beating has a paper quality of a high denseness and fine porous state, and in the aluminum electrolytic capacitor fabricated by the use of the separator, both properties of impedance and short circuit defect rate are enhanced.

However, when using the separator with a content of a 100% by mass of the beatable regenerated cellulose fiber as shown in Patent Literature 1, the tearing strength is low, and thus there has been a case where the separator is broken during the manufacturing step of the aluminum electrolytic capacitor.

The breakage of the separator is considered to be the following reason.

Fine fibrils each having a size of several tens nm to several μm are obtained by increase in the degree of beating of the beatable regenerated cellulose fiber. Since the obtained fibrillated fine fiber is highly rigid and is difficult to be collapsed, it is not bound in the form of a film just like the fibrillated fine fiber of natural fiber, when being made into a paper. Therefore, by using, for the separator, the fibrillated fine fiber obtained by beating the regenerated cellulose fiber, it is possible to obtain a separator having an extremely high denseness, in which fine fibers that are independent with each other are constituted by numerous adhesion points (hydrogen bond). In spite of the fact that the obtained separator has a high denseness, the paper quality of the separator is finely porous in terms of its structure, and moreover, since the cross-section of the fibril has a shape close to a perfect circle, a flow of ions are not be disturbed unlike a natural fiber haying a relatively flat surface. As a result, the aluminum electrolytic capacitor fabricated by the use of the separator in which a beating material of the regenerated cellulose fiber is blended improves both of impedance and short circuit defect rate.

However, although the beatable regenerated cellulose fiber is increased in the bonds between the fibers by beating to thereby enhance the tensile strength, the tearing strength becomes low drastically when further increasing the degree of beating of the fiber. Namely, the relation of the tensile strength due to the bond between the fibers and the tearing strength is reciprocity relation, and although the tensile strength is enhanced as the degree of beating becomes higher, the tearing strength is lowered.

Here, when inhibiting the beating in order to enhance the tearing strength, since not only the tensile strength but also the denseness is lowered, the short circuit defect rate of the aluminum electrolytic capacitor increases.

In Patent Literature 2, there is proposed a method of, in order to enhance the tearing strength of the separator and suppress the breakage of the separator during the production step of the aluminum electrolytic capacitor, carrying out mixed papermaking by the use of the regenerated cellulose fiber and the beaten natural cellulose fiber. By the use of 10 to 30% by mass of the natural cellulose fiber and a remaining amount of the beaten regenerated cellulose fiber, the natural cellulose fiber forms a bone structure, and it is possible to obtain a separator which is excellent in both of tearing strength and denseness by embedding the space between the bone structures with the beaten regenerated cellulose fiber.

However, as in Patent Literature 2, when the natural cellulose fiber is blended, there is a problem that the impedance worsens.

It is considered that the reason is as follows.

As mentioned above, the regenerated cellulose fiber gives a fibril having a high rigidity and a cross-sectional shape of a substantially perfect circle. On the other hand, the natural cellulose fiber inhibits an ion flow since the cross-section is flat and large in comparison with that of the regenerated cellulose fiber. As a result, impedance is worsened in the aluminum electrolytic capacitor fabricated by the use of the separator in which a beaten raw material of the regenerated cellulose fiber and the natural cellulose fiber are blended.

Furthermore, the separator of Patent Literature 2 has lowered denseness in comparison with the separator constituted by only the regenerated cellulose fiber having a high degree of beating as shown in Patent Literature 1. Accordingly, when the separator of Patent Literature 2 is used for the aluminum electrolytic capacitor, the short circuit defect rate is also increased.

In Patent Literature 3, there is proposed a separator which is fabricated by a wet spunbond method and is composed of a regenerated cellulose continuous long fiber having a fiber diameter of 0.5 to 8.0 μm, and which is capable of reducing impedance and shore circuit defect rate in a case of the use for an aluminum electrolytic capacitor.

However, as described in Patent Literature 3, since the wet spunbond method produces an anisotropic fiber arrangement, it is difficult to form a dense web like in a papermaking method. In Patent Literature 3, such a problem is solved by the use of the continuous long fiber having a uniform and small fiber diameter, but the denseness thereof is not yet the same as that of the separator obtained by the use of the fibril of the regenerated cellulose having a high degree of beating. Particularly, in the region of a lower basis weight that is below the range of basis weigh mentioned in Patent Literature 3, the short circuit defect is increased, and thus it is not possible to deal with reduced impedance of the aluminum electrolytic capacitor in response to the recent requirement.

Furthermore, the fiber constituting the separator of Patent Literature 3 is cupra rayon obtained by the use of a copper ammonia solution, in the production step of raw material, and thus contains a copper ion within the fiber. Accordingly, there is a danger of short-circuiting that the copper ion is precipitated inside the aluminum electrolytic capacitor, after the aluminum electrolytic capacitor comes onto the market.

In Patent Literature 4, there is proposed a separator that is improved in tensile strength while having low impedance, by papermaking a beaten cellulose fiber as a raw material and by performing impregnation coating with a paper-strengthening agent. It is possible to realize a capacitor that is low in both of short circuit defect rate and impedance, by the use of the separator for the aluminum electrolytic capacitor.

However, since the separator described in Patent Literature 4 contains the regenerated cellulose fiber having a high CSF value, it cannot be said that the denseness of the separator is sufficient. Recently, since further reduction in the short circuit defect rate is required, it is necessary to enhance the denseness of the separator.

Here, the tearing strength becomes low when lowering the CSF value of the regenerated cellulose fiber in order to enhance the denseness of the separator.

In Patent Literature 5, there is proposed a separator that is excellent in strength in adherence of an electrolytic solution by the use of the regenerated cellulose fiber in which freeness is controlled.

However, the separator described in Patent Literature 5 has a lower degree of beating than the separator described in Patent Literature 1. Accordingly, in the region, of a lower basis weight which is below the range of basis weight mentioned in Patent Literature 5, the separator is lack in denseness. As a result, the short circuit defect of the aluminum electrolytic capacitor is increased.

Furthermore, the separator described in Patent Literature 5 has a weaker bonding power between the fibers than the separator described in Patent Literature 2. Therefore, although the separator can be resistive against deformation without violent movement such as expansion or shrinkage due to heating after formation of a capacitor element and impregnation with the electrolytic solution, the separator is broken in a step of violent movement such as a winding step of the capacitor element.

In Patent Literature 6, there is proposed a separator that is improved in both of denseness and impedance properties at the same time by blending of an esparto fiber that is a natural fiber having a cross-section of small diameter and approximate circle.

However, the denseness of the separator composed of the pulp of the esparto fiber is not equal to that of the separator obtained by the use of the fibril of the regenerated cellulose fiber having a high degree of beating. Therefore, it cannot be said that the separator described in Patent Literature 6 has sufficient denseness of separator that is recently required for reduction in the short circuit defect rate.

In Patent Literature 7, there is proposed a separator in which the impedance performance is improved together with reduction of the short circuit defect, by formation of a separator having two layers of a natural cellulose layer having a high degree of beating and a layer having a low degree of beating.

The separator described in Patent Literature 7 is effective in reduction of the short circuit defect rate since the separator has the natural cellulose layer having a high degree of beating, but the impedance performance is easily worsened in comparison with the separator described in Patent Literature 1. Accordingly, further reduction of the impedance is required.

As mentioned above, since denseness, impedance performance and tearing strength and the like required for the separator have a complicatedly-related and contrary relation, it is difficult to enhance all these properties at the same time.

The present invention has been made to solve the above problems, and an object of the present invention is to provide a separator excellent in the tearing strength, denseness and impedance performance. In addition, an object of the present invention is to provide an aluminum electrolytic capacitor having an excellent impedance performance, and capable of improving short circuit defect rate and enhancing yield, by the use of the separator of the present invention.

Solution to Problem

The separator of the present invention is a separator interposed between an anode and a cathode;
the separator including beatable regenerated cellulose fibers, and
a CSF value X [ml] and a tear index Y [mN·m$^2$/g] of the separator are within the ranges satisfying the following formulas 1 to 3 at the same time.

$0 \leq X \leq 300$   Formula 1

$15 \leq Y \leq 100$   Formula 2

$Y \geq 0.175X - 2.5$   Formula 3

In the separator of the present invention, more preferable is that the CSF value X and the tear index Y of the separator are within the ranges satisfying the following formulae 1 to 4.

$0 \leq X \leq 300$   Formula 1

$15 \leq Y \leq 100$   Formula 2

$Y \geq 0.175X - 2.5$   Formula 3

$Y \geq 0.05X + 45$   Formula 4

In a the separator of the present invention, further preferable is that the CSF value X and the tear index Y of the separator are within the ranges satisfying the following formulae 2 to 5.

$15 \leq Y \leq 100$   Formula 2

$Y \geq 0.175X - 2.5$   Formula 3

$Y \leq 0.05X + 45$   Formula 4

$0 \leq X \leq 100$   Formula 5

In the separator of the present invention, the thickness is more preferably 10 to 50 μm.

In the separator of the present invention, the density is more preferably 0.25 to 0.70 g/cm$^3$.

Note that, in the present invention, the "CSF value" is a value measured in accordance with "JIS P8121-2 Pulps-Determination of drainability—Part 2; Canadian Standard freeness method".

In addition, the "tear index" is a value obtained by dividing the tearing strength by the basis weight, and is a tear index in the cross direction (CD) defined in "JIS P8116 "Paper-Determination of tearing resistance—Elmendorf tearing tester method"".

Furthermore, for example, when the aforementioned separator is constituted by a mixed raw material of regenerated cellulose fibers having two different degrees of beating of the fiber A and the fiber B, it is possible that the CSF value X and the tear index Y of the separator are within the range satisfying the following formulae 1 to 3.

The aluminum electrolytic capacitor of the present invention is constituted by interposing a separator between an anode and a cathode, and the separator of the present invention is used as the separator.

Advantageous Effects of Invention

According to the present invention, it is possible to provide the separator for the aluminum electrolytic capacitor, which is excellent in the tearing strength, denseness and impedance performance.

Moreover, it is possible to provide the aluminum electrolytic capacitor having an excellent impedance performance, and capable of improving short circuit defect rate and enhancing yield, by the use of the separator.

DESCRIPTION OF EMBODIMENTS

Figure 1:
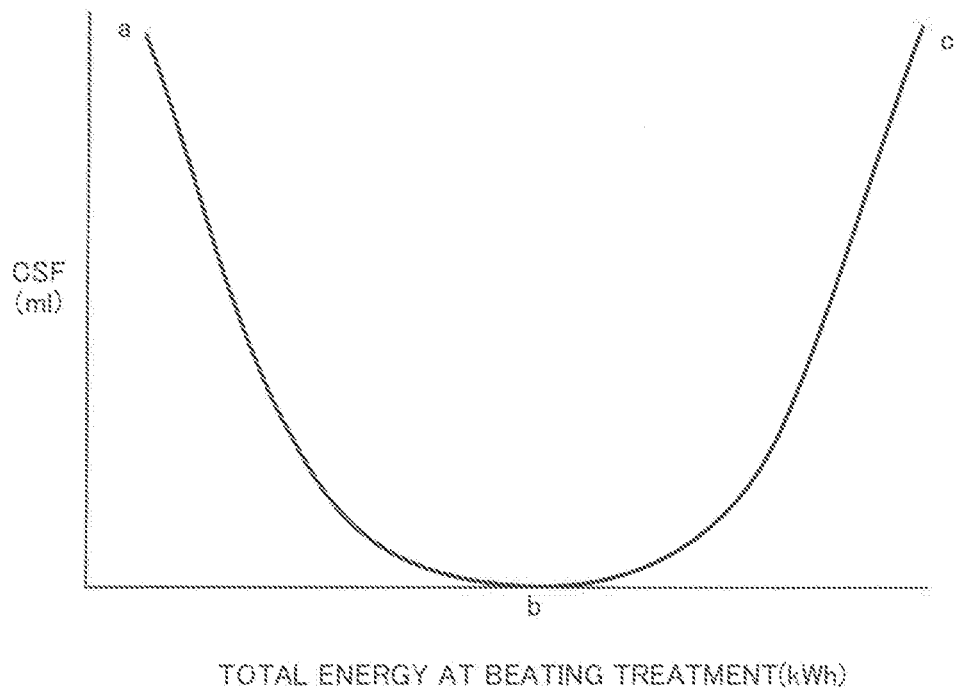
FIG. 1 is an explanatory view of the relation between the total energy at the beating treatment and the CSF value, in relation to the fiber constituting the separator of the present invention.

Hereinafter, one embodiment of the present invention will be explained in detail by referring drawings and the like.

The separator of the present embodiment is a separator interposed between an anode and a cathode:

the separator including beatable regenerated cellulose fibers, and a CSF value X [ml] and a tear index Y [mN·m²/g] of the separator are within the ranges satisfying the following formulae 1 to 3 at the same time, more preferably within the ranges satisfying the following formulae 1 to 4 at the same time, and further preferably within the ranges satisfying the following formulas 2 to 5 at the same time.

$0 \leq X \leq 300$      Formula 1

$15 \leq Y \leq 100$      Formula 2

$Y \geq 0.175X - 2.5$      Formula 3

$Y \leq 0.05X + 45$      Formula 4

$0 \leq X \leq 100$      Formula 5

Furthermore, the aluminum electrolytic capacitor of the present embodiment use the separator having the aforementioned configuration as a separator and has a configuration in which the separator is interposed between an anode and a cathode.

The tearing strength is proportional to the basis weight that is a mass per 1 m² of paper.

Accordingly, the tear index that is a value calculated by dividing the value of the tearing strength by the basis weight is used as an index which is for making a comparison between the tearing strengths and which is obtained by elimination of factors such as the basis weight of paper and the thickness.

The tearing strength is derived mainly from properties of a raw material. The tear index is excellent from the viewpoint that not only the comparison among the properties of the paper of the separator but also the comparison among the properties of the raw material can be made at the same time by comparison among the tear index.

The tear index varies largely depending on the degree of beating of the raw material. The tear index gradually increases along with the increase of the degree of beating, and when the degree of beating further increases, the tear index becomes lowered.

Note that the equipment for beating a fiber may be any equipment to be generally used for preparation of papermaking raw material. Generally, examples thereof include a beater, a conical refiner, a disc refiner, a high-pressure homogenizer, and the like.

The fiber is beaten to be micronized.

When the micronized regenerated cellulose is tried to be filtered on a sieve plate, it is influenced by a fiber mat initially accumulated on the sieve plate. After that, the resistance of a suspension trying to pass through the sieve plate becomes larger. Accordingly, when the regenerated cellulose is micronized more by beating, the CSF value gradually becomes low, and reaches the lower limit.

The value of the lower limit of the freeness varies depending on fineness of the fiber subjected to beating and conditions of a beating treatment. Accordingly, there is a case where the freeness reaches the lower limit before the CSF value is decreased to 0 ml (namely, + value), or there is a case where, even after the CSF value reaches 0 ml, the CSF value is not be increased instantly, but the CSF value becomes larger after exhibiting 0 ml for a while.

When the fiber is further beaten from a state in which the CSF value reaches the lower limit, the fine fibers which pass through the pore of the sieve plate are increased, and the CSF value then turns upward.

In FIG. 1, the aforementioned change of the state will be shown. FIG. 1 is an explanatory view of the relation between the total energy (kWh) of the beating treatment and the CSF value (ml), as to the fiber (regenerated cellulose fiber) constituting the separator of the present invention.

As shown in FIG. 1, the CSF value goes down from a state a in which the CSF value is large by micronization of the regenerated cellulose through beating, and reaches once the lower limit (state b). Then, the fine fibers passing through the pore of the sieve plate are increased by further beating, and thus the CSF value turns upward. In addition, when the CSF value increases and becomes large, the value reaches a state c.

For example, when using a mixed raw material of fiber (regenerated cellulose fiber) having two different degrees of beating of the fiber A and the fiber B, the separator of the present embodiment can be obtained.

Note that, in the following, among the fiber A and the fiber B, the fiber A is assumed to be a fiber having a lower degree of beating, and the fiber B is assumed to be a fiber having a higher degree of beating.

There is adopted, as the fiber A, a fiber having a CSF value of 500 to 0 ml.

In addition, a blending ratio of the fiber A is 20 to 80% by mass.

There is adopted, as the fiber B, a fiber having a CSF value of 1 to 500 ml in which the CSF value is once lowered to the lower limit (0 ml or + value) and then turns upward by further beating.

A blending ratio of the fiber B is 20 to 80% by mass.

In the present embodiment, it is possible to provide the separator for aluminum electrolytic capacitor which is excellent in tearing strength, denseness and impedance performance, by adopting the aforementioned configuration. By the use of the separator for the aluminum electrolytic capacitor, it becomes possible to make the impedance performance excellent, to improve the short circuit defect, and further to enhance a yield in the production steps of the aluminum electrolytic capacitor.

As a result of testing as to various materials, and constituent ratios, as mentioned above, an excellent result is obtained when blending, in an amount of 20 to 80% by mass, respectively, the regenerated cellulose fiber A that is beaten until the CSF value is 500 to 0 ml and the regenerated cellulose fiber B having a CSF value of 1 to 500 ml in which the CSF value is once lowered to the lower limit and then turns upward by further beating, followed by papermaking.

Namely, it becomes possible to achieve both properties of the tearing strength and the denseness which have a contrary relation, by mixing and papermaking, in the aforementioned amount, the fiber A and the fiber B which are the regenerated cellulose fibers having two different degrees of beating.

The aluminum electrolytic capacitor using the separator of the present embodiment can be constituted by impregnating the separator potion with an electrolytic solution and keeping the solution in the separator, and by separating an anode foil and a cathode foil through, the use of the separator.

Note that, in the aluminum electrolytic capacitor, a plurality of separator may be interposed between the both electrodes within the acceptable range of an outer diameter of the capacitor element, as necessary.

The electrolytic solution may be any of a usually available electrolytic solution. The electrolytic solutions usually include solutions in which a solute such as boric acid, adipic acid, maleic acid or an ammonium salt thereof is dissolved in a solvent such as ethylene glycol (hereinafter, referred to as EG), γ-butyrolactone (hereinafter, referred to as GBL), dimethylformamide, or sulfolane, and the like.

However, the electrolytic solution is not limited to the above examples and combinations, and may be any of e electrolytic solutions usually available.

[Explanation of Separator]

The separator of the present embodiment uses the beatable regenerated cellulose fiber, and is within the range in which, when the CSF value of the separator is X [ml] and the tear index of the cross direction (CD) is Y [mN·m$^2$/g], the CSF value X and the tear index Y are within the ranges satisfying the following formulae 1 to 3 at the same time. More preferably, the CSF value X and the tear index Y are within the ranges satisfying the following formulae 1 to 4 at the same time. Further preferably, the separator has the CSF value X and the tear index Y which are within the ranges satisfying the following formulae 2 to 5 at the same time. Note that the "cross direction (CD)" of the separator means the direction of width of the separator wound in a longitudinal manner.

$0 \leq X \leq 300$      Formula 1

$15 \leq Y \leq 100$      Formula 2

$Y \geq 0.175X - 2.5$      Formula 3

$Y \leq 0.05X + 45$      Formula 4

$0 \leq X \leq 100$      Formula 5

The separator is excellent in the tearing strength and has a high denseness, when satisfying the formulae 1 to 3 at the same time, and thus it is possible to improve both of breakage defect rate and short circuit defect rate, in using the separator for the aluminum electrolytic capacitor.

In addition, when satisfying the formulae 1 to 4 at the same time, it is possible to enhance the denseness of the separator more and to reduce the short circuit defect rate more.

Furthermore, when satisfying the formulae 2 to 5 at the same time, it is possible to further enhance the denseness of the separator and to further reduce the short circuit defect rate.

In the Formula 1, when the CSF value X of the separator is larger than 300 ml, the denseness of the separator is lowered, and thus there is a danger that the short circuit defect of the aluminum electrolytic capacitor is increased.

In the Formula 2, when the tear index Y is larger than the upper limit of the Formula 2, the short circuit defect rate of the aluminum electrolytic capacitor becomes worse.

On the other hand, when the tear index Y is smaller than the lower limit of the Formula 2, the breakage defect in the production steps of the aluminum electrolytic capacitor is increased.

The thickness of the separator is preferably 10 to 50 μm. When the thickness is below 10 μm, the short circuit defect is increased. In addition, when the thickness exceeds 50 μm, there is a case where the element down-sizing becomes difficult or a case where the impedance performance becomes worse.

The density of the separator is preferably 0.25 to 0.70 g/cm$^3$. When the density is below 0.25 g/cm$^3$, the denseness of the separator is lowered to thereby increase the short circuit defect. In addition, when the density exceeds 0.70 g/cm$^3$, the impedance performance becomes worse.

Furthermore, as mentioned above, there can be obtained the separator of the present embodiment by the use of the raw material obtained by beating the beatable regenerated cellulose fiber, and by mixing and papermaking the two fibers of the fiber A and the fiber B which are fibers having different degrees of beating.

The reason why mixing the fiber A and the fiber B which have different degrees of beating is that the features of the fiber A and the fiber B are achieved at the same time.

The separator using the fiber A having the low degree of heating alone is excellent in the tearing strength, but is lack in the denseness.

On the other hand, the separator using the fiber B having the high degree of beating alone is excellent in the denseness, but has weak tearing strength.

It can be seen that the separator of the present invention is excellent in at least one property of the denseness and the tearing strength by making a comparison between the separator of the present invention obtained by mixing and making, into a sheet form, the fiber A and the fiber B and the separator obtained by making, into a sheet form, the raw material singly beaten the same CSF value. The raw material beaten solely has weak teaming strength because of being micronized in comparison with the fiber A, and is lack in the denseness because of not being so micronized in comparison with the fiber B.

The role required for the fiber A is to enhance the tearing strength of the separator. The regenerated cellulose fibers having a lower degree of beating than the fiber are intermingled with each other to thereby constitute a three-dimensional network structure, and the crossing point of the network structure is supported by bonding with the fibrils derived from the fiber A, and the fiber B, and thus the tearing strength of the separator is enhanced. Furthermore, since the fiber is the regenerated cellulose fiber beaten although the beating degree of the regenerated cellulose fiber is not so high as the fiber B having a high degree of beating, the denseness of the separator and the impedance are not damaged.

The beaten raw material has preferably the CSF value of 580 to 0 ml as the degree of beating of the fiber A. When the CSF value is more than 500 ml, the tearing strength cannot be enhanced. Namely, when the CSF value is larger than 500 ml, there are many fibers having a low degree of beating, and since the bonding between the fibers is weak, the resistance of the fiber against drawing is weak even if the three-dimensional network structure is constituted. In addition, when the degree of beating of the fiber is made high until the CSF value turns upward after the CSF value is once lowered to the lower limit (0 ml or + value), the fiber is excessively micronized, and thus in the same manner as above, the resistance of the fiber against drawing is weak and the tearing strength of the separator is extremely lowered.

A blending ratio of the fiber A is preferably 20 to 80% by mass. When the blending ratio is less than 20% by mass, the tearing strength becomes lowered. When the blending ratio exceeds 80% by mass, the sheet obtained by papermaking is not uniform, and thus the short circuit defect of the aluminum electrolytic capacitor is increased.

The role required for the fiber B is to enhance the denseness of the separator. The denseness of the separator is enhanced by embedding the space of the separator with the regenerated cellulose fiber having the high degree of beating.

The degree of beating of the fiber 5 is preferably a CSF value of 1 to 500 ml in which the CSF value of the beaten raw material is once lowered to 0 ml (0 ml or + value) and then turns upward by further beating. When the CSF value of the fiber B is before the reaching of the lower limit or is the lower limit, the micronization of the fiber B is not sufficient, and the texture of the sheet obtained by mixing with the fiber A is not uniform, and thus the short circuit defect of the aluminum eleotrolytic capacitor is increased. When the CSF value is once lowered to the lower limit, then turns upward by further beating and the CSF value exceeds 500 ml, the fiber is excessively micronized, and thus the fiber is not suitable as a raw material for papermaking.

A blending ratio of the fiber B is preferably 20 to 80% by mass, when the blending ratio is less than 20% by mass, the texture of the sheet obtained by papermaking is not uniform, and thus the short circuit defect of the aluminum electrolytic capacitor is increased. When the blending ratio exceeds 80% by mass, the tearing strength of the separator becomes lowered.

Furthermore, in the separator of the present invention, for the following reason, only the regenerated cellulose fiber is blended, but a natural cellulose fiber and other synthetic fiber are not blended.

The fibril obtained by beating the regenerated cellulose fiber has a small fiber diameter and a high rigidity. Accordingly, since the fibers and fibrils are bonded by hydrogen bond or the like at the crossing point, but the fibers and fibrils are not bonded in the form of film with each other on a plane or at a line, with the result that there is the feature that the impedance does not become worse.

On the other hand, the natural cellulose fiber has a low rigidity and a strong bonding power between the fibers. Namely, at the crossing point of the natural cellulose fibers, the fibers are not only intermingled, but also, in the drying step of the sheet, the fibers are adsorbed through hydrogen bond or the like to thereby be fused between planes, between lines, or between the combination of the plane and the line. As a result, the impedance becomes worse.

The synthetic fiber is different from the cellulose fiber, and is only intermingled at the crossing point of the fibers, and the bonding power between the fibers is weak, and has various problems. For example, when the synthetic fiber is blended as the fiber A, the tearing strength is weak. This is because the fiber has low resistance against drawing. Furthermore, for example, when the micronized synthetic fiber is blended as the fiber B, the short circuit defect is increased. It is possible to enhance the sheet strength by heat-fusion or adherence through the use of various binder fibers, but when fusion portions are increased, the impedance becomes worse.

AS the regenerated cellulose fiber, there are: a cuprammonium regenerated cellulose fiber obtained by a wet spinning method; a viscose regenerated cellulose rayon; and a solvent-spun regenerated cellulose fiber obtained by the use of a solution that a cellulose is dissolved, in a molecular state, in an organic solvent such as N-methylmorphorine-N-oxide, as a spinning dope; and the like.

Among them, typical beatable regenerated cellulose fibers include a polynosic rayon as the viscose-regenerated cellulose fiber, and a Lyocell fiber as the solvent-spun regenerated cellulose fiber, and the fiber layer can be easily formed by the use of these regenerated cellulose fibers.

However, cupra rayon being the cuprammonium regenerated cellulose fiber uses a copper ammonia solution in the production step of the raw material, and thus a copper ion is contained in the fiber. Accordingly, when the cupra rayon is used as the separator for the aluminum electrolytic capacitor, there is a danger of short-circuiting such as precipitation of the copper ion inside the capacitor, after the aluminum electrolytic capacitor comes onto the market. Therefore, the cupra rayon is not suitable as a material of the separator for the aluminum electrolytic capacitor.

However, the above examples are not limiting, any of the beatable regenerated cellulose fibers may be used except a case where there is a problem in terms of impurities as with the cuprammonium regenerated cellulose, and for example, the polynosic rayon fiber and the Lyocell fiber which will be explained hereinafter in detail are not limiting.

When the density is within the range of 0.25 to 0.70 g/cm$^3$, the thickness of the separator may be controlled by calendering processing, as necessary.

In addition, paper-strengthening processing may be applied, as necessary.

Furthermore, there may be used an additive usually used in the papermaking steps such as a dispersant or an anti-foaming agent, as necessary.

The present inventors have found that, by adoption of the above configuration of the separator, a satisfactory separator can be obtained both in the production step of the aluminum electrolytic capacitor and in terms of properties of the aluminum electrolytic capacitor. Namely, there is provided a satisfactory separator having an excellent impedance performance, an improved short circuit defect rate and an enhanced yield in the production step of the capacitor.

[Measuring Methods of Properties of Separator and Aluminum Electrolytic Capacitor]

The specific measurements of the respective properties of the separator and the aluminum electrolytic capacitor in accordance with the present embodiment were carried out in the following conditions and methods.

[CSF of Separator]

The CSF value of the separator was measured in accordance with "JIS P8121-2 Pulps-Determination of drainability—Part 2; Canadian Standard freeness method".

[Thickness]

The thickness of the separator was measured in accordance with the method of using a micrometer of "5.1.1 Measuring tools and measuring method a case where an outer micrometer is used" defined in "JIS C 2300-2" Cellulose papers for electrical purposes—Part 2: Method of test" 5.1 Thickness" and of folding a sheet ten times in accordance with "5.1.3 Case that a thickness is measured by folding a paper".

[Density]

The density of the separator which was completely dried was measured in accordance with the Method B defined in "JIS C 2300-2 "Cellulose papers for electrical purposes—Part 2: Method of test" 7.0A Density".

[Tear Index]

The tearing strength of the separator in the cross direction (CD) was measured in accordance with the method defined in "JIS P 8116 "Paper-Determination of tearing resistance—Elmendorf tearing tester method"". Next, the tear index was calculated by dividing the thus obtained value of the tearing strength by the basis weight of the separator.

[Breakage Defect Rate]

Each separator and an aluminum foil cut so as to be a predetermined electrostatic capacity were used, and a capacitor element was formed by winding on an element winding machine. After repetition of this procedure 1000 times, the number of the capacitor elements, capable of being wound without breakage of the separator was counted, and the number of the breakage defects was obtained by subtracting the number of the capacitor elements from 1000. Then, the number of the breakage defects was divided by 1000, and the breakage defect rate was represented by a percentage.

[Short Circuit Defect Rate]

The short circuit defect rate was obtained by the use of the capacitor element, capable of being wound without breakage defect, and by counting, with the wound element, the number of the short circuit defects before the impregnation with the electrolytic solution and during the aging. Then, the numbers of the short circuit defects were divided by the number of the elements capable of being wound without breakage defect, and the short circuit defect rate was represented by the percentage.

[Impedance]

The impedance of the fabricated aluminum electrolytic capacitor was measured by the use of an LCR meter at 20° C. at a frequency of 100 kHz.

EXAMPLE

Hereinafter, the specific Examples according to the present invention, Comparative Examples and Conventional Examples will be explained.

Note that the separator of each Example was constituted by a papermaking method and by the use of the regenerated cellulose fiber.

Example 1

There was used a papermaking raw material obtained by blending, as the fiber A, 20% by mass of a Lyocell fiber being a regenerated cellulose fiber having a CSF value of 0 ml, and as the fiber B, 80% by mass of a Lyocell fiber being a regenerated cellulose fiber having a CSF value of 300 ml in which the CSF value is once lowered to 0 ml (lower limit) and then turns upward by further beating, and thus there was obtained a separator having a thickness of 10.0 µm, a density of 0.400 g/cm$^3$, and a tear index of 17 mN·m$^2$/g by a Fourdrinier papermaking method. A CSF value of the thus obtained separator was 18 ml.

There was formed, by the use of the separator, an aluminum electrolytic capacitor element having a rated voltage of 6.3 V, a capacity of 1000 µF, and an element outer diameter of 7.6 mm, and after impregnation with a GBL-based electrolytic solution, an aluminum electrclytic capacitor of Example 1 was produced by inserting the element in a casing and sealing the element.

Example 2

There was used a papermaking raw material obtained by blending, as the fiber A, 50% by mass of a Lyocell fiber being a regenerated cellulose fiber having a CSF value of 0 ml, and as the fiber B, 50% by mass of a Lyocell fiber being a regenerated cellulose fiber having a CSF value of 350 ml in which the CSF value is once lowered to 0 ml (lower limit) and then turns upward by further beating, and thus there was obtained a separator having a thickness of 20.0 µm, a density of 0.450 g/cm$^3$, and a tear index of 27 mN·m$^2$/g by a Fourdrinier papermaking method. A CSF value of the thus obtained separator was 0 ml.

There was formed, by the use of the separator, an aluminum electrolytic capacitor element having a rated voltage of 6.3 V, a capacity of 1000 µF, and an element outer diameter of 7.9 mm, and after impregnation with a GBL-based electrolytic solution, an aluminum electrolytic capacitor of Example 2 was produced by inserting the element in a casing and sealing the element.

Example 3

There was obtained, by the use of the same papermaking raw material as in the separator of Example 2, a separator having a thickness of 40.0 µm, a density of 0.400 g/cm$^3$, and a tear index of 52 mN·m$^3$/g by a cylinder papermaking method, A CSF value of the thus obtained separator was 0 ml.

There was formed, by the use of the separator, an aluminum electrolytic capacitor element having a rated voltage of 6.3 V, a capacity of 1000 µF, and an element outer diameter of 8.5 mm, and after impregnation with a GBL-based electrolytic solution, an aluminum electrolytic capacitor of Example 3 was produced by inserting the element in a casing and sealing the element.

Comparative Example 1

There was used a papermaking raw material obtained by blending, as the fiber A, 50% by mass of a Lyocell fiber being a regenerated cellulose fiber having a CSF value of 10 ml, and as the fiber B, 50% by mass of a Lyocell fiber being a regenerated cellulose fiber having a CSF value of 350 ml in which the CSF value is once lowered to 0 ml (lower limit) and then turns upward by further beating, and thus there was obtained a separator having a thickness of 9.0 µm, a density of 0.422 g/cm$^3$, and a tear index of 13 mN·m$^2$/g by a Fourdrinier papermaking method. A CSF value of the thus obtained separator was 0 ml.

There was formed, by the use of the separator, an aluminum electrolytic capacitor element having a rated, voltage of 6.3 V, a capacity of 1000 µF, and an element outer diameter of 7.5 mm, and after impregnation with a GBL-based electrolytic solution, an aluminum electrolytic capacitor of Comparative Example 1 was produced by inserting the element in a casing and sealing the element.

Comparative Example 2

A sheet was obtained by the use of the same paper-making raw material as in Comparative Example 1 and by a Fourdrinier paper method. Subsequently, according to the method of Example 1 of JP 2006-253728 A, the sheet was subjected to paper-strengthening processing to give a separator having a thickness of 16.0 μm, a density of 0.238 g/cm$^3$, and a tear index of 13 mN·m$^2$/g. A CSF value of the thus-obtained separator was 0 ml.

There was formed, by the use of the separator, an aluminum electrolytic capacitor element having a rated voltage of 6.3 V, a capacity of 1000 μF, and an element outer diameter of 7.6 mm, and after impregnation with a GBL-based electrolytic solution, an aluminum electrolytic capacitor of Comparative Example 2 was produced by inserting the element in a casing and sealing the element.

Conventional Example 1

By the use of a papermaking raw material having a CSF value of 160 ml in which the CSF value is once lowered to 0 ml (lower limit) and then turns upward by further beating a Lyocell fiber being a regenerated cellulose fiber, there was obtained a sheet by a Fourdrinier papermaking method. Subsequently, according to the method of Example 1 of JP 2006-253728 A, the sheet was subjected to paper-strengthening processing to give a separator having a thickness of 20.0 μm, a density of 0.425 g/cm$^3$, and a tear index of 6 mN·m$^2$/g. A CSF value of the thus obtained separator was 150 ml.

There was formed, by the use of the separator, an aluminum electrolytic capacitor element having a rated voltage of 6.3 V, a capacity of 1000 μF, and an element outer diameter of 7.9 mm, and after impregnation with a GBL-based electrolytic solution, an aluminum electrolytic capacitor of Conventional Example 1 was produced by inserting the element in a casing and sealing the element.

Conventional Example 2

There was obtained, according to the method of Example 1 of JP 53-142652 A and by a cylinder paper method, a separator having a thickness of 40.0 μm, a density of 0.400 g/cm$^3$, and a tear index of 43 mN·m$^2$/g. A CSF value of the thus obtained separator was 620 ml.

There was formed, by the use of the separator, an aluminum electrolytic capacitor element having a rated voltage of 6.3 V, a capacity of 1000 μF, and an element outer diameter of 8.5 mm, and after impregnation with a GBL-based electrolytic solution, an aluminum electrolytic capacitor of Conventional Example 2 was produced by inserting the element, in a casing and sealing the element.

Example 4

There was used a papermaking raw material obtained by blending, as the fiber A, 20% by mass of a polynosic rayon fiber being a regenerated cellulose, fiber having a CSF value of 0 ml, and as the fiber B, 80% by mass of a polynosic rayon fiber being a regenerated cellulose fiber having a CSF value of 1 ml in which the CSF value is once lowered to 0 ml (lower limit) and then turns upward by further beating, and thus there was obtained a sheet by a Fourdrinier papermaking method. Subsequently, the sheet was subjected to calendaring processing to give a separator having a thickness of 25.0 μm, a density of 0.540 g/cm$^3$, and a tear index of 17 mN·m$^2$/g. A CSF value of the thus obtained separator was 0 ml.

There was formed, by the use of the separator, an aluminum electrolytic capacitor element having a rated voltage of 16 V, a capacity of 550 μF, and an element outer diameter of 9.0 mm, and after impregnation with a GBL-based electrolytic solution, an aluminum electrolytic capacitor of Example 4 was produced by inserting the element in a casing and sealing the element.

Example 5

There was used a papermaking raw material obtained by blending, as the fiber A, 30% by mass of a Lyocell fiber being a regenerated cellulose fiber having a CSF value of 100 ml, and as the fibers, 70% by mass of a Lyocell fiber being a regenerated cellulose fiber having a CSF value of 20 ml in which the CSF value is once lowered to 0 ml (lower limit) and then turns upward by further beating, and thus there was obtained a separator having a thickness of 30.0 μm, a density of 0.400 g/cm$^3$, and a tear index of 24 mN·m$^2$/g by a Fourdrinier papermaking method. A CSF value of the thus obtained separator was 0 ml.

There was formed, by the use of the separator, an aluminum electrolytic capacitor element having a rated voltage of 16 V, a capacity of 550 μF, and an element outer diameter of 9.2 mm, and after impregnation with a GBL-based electrolytic solution, an aluminum electrolytic capacitor of Example 5 was produced by inserting the element in a casing and sealing the element.

Comparative Example 3

There was used a papermaking raw material obtained by blending, as the fiber A, 40% by mass of a Lyocell fiber being a regenerated cellulose fiber having a CSF value of 20 ml in which the CSF value is once lowered to 0 ml (lower limit) and then turns upward by further beating, and as the fiber B, 60% by mass of a Lyocell fiber being a regenerated cellulose fiber having a CSF value of 80 ml in which the CSF value is once lowered to 0 ml (lower limit) and then turns upward by further beating, and thus there was obtained a separator having a thickness of 30.0 μm, a density of 0.400 g/cm$^3$, and a tear index of 5 mN·m$^2$/g by a Fourdrinier papermaking method. A CSF value of the thus obtained separator was 55 ml.

There was formed, by the use of the separator, an aluminum electrolytic capacitor element having a rated voltage of 16 V, a capacity of 550 μF, and an element outer diameter of 9.2 mm, and after impregnation with a GBL-based electrolytic solution, an aluminum electrolytic capacitor of Comparative Example 3 was produced by inserting the element in a casing and sealing the element.

Comparative Example 4

There was used a papermaking raw material obtained by blending, as the fiber A, 20% by mass of a Lyocell fiber being a regenerated cellulose fiber having a CSF value of 30 ml, and as the fiber B, 80% by mass of a Lyocell fiber being a regenerated cellulose fiber having a CSF value of 5 ml and thus there was obtained a separator having a thickness of 35.0 μm, a density of 0.371 g/cm$^3$, and a tear index of 105 mN·m²/g by a cylinder papermaking method. A CSF value of the thus obtained separator was 20 ml.

There was formed, by the use of the separator, an aluminum electrolytic capacitor element having a rated voltage of 16 V, a capacity of 550 µF, and an element outer diameter of 9.3 mm, and after impregnation with a GBL-based electrolytic solution, an aluminum electrolytic capacitor of Comparative Example 4 was produced by inserting the element in a easing and sealing the element.

Comparative Example 5

There was used a papermaking raw material obtained by blending, as the fiber A, 80% by mass of a Lyocell fiber being a regenerated cellulose fiber having a CSF value of 0 ml, and as the fiber B, 20% by mass of a Lyocell fiber being a regenerated cellulose fiber having a CSF value of 680 ml in which the CSF value is once lowered to 0 ml (lower limit) and then turns upward by further beating, and thus there was obtained a separator having a thickness of 35.0 µm, a density of 0.400 g/cm³, and a tear index of 105 mN·m²/g by a cylinder papermaking method. A CSF value of the thus obtained separator was 0 ml.

There was formed, by the use of the separator, an aluminum electrolytic capacitor element having a rated voltage of 16 V, a capacity of 550 µF, and an element outer diameter of 9.3 mm, and after impregnation with a GBL-based electrolytic solution, an aluminum electrolytic capacitor of Comparative Example 5 was produced by inserting the element in a casing and sealing the element.

Conventional Example 3

There was obtained, by the use of a regenerated cellulose fiber having a CSF value of 0 ml as a papermaking raw material, a separator having a thickness of 30.0 µm, a density of 0.400 g/cm³, and a tear index of 7 mN·m²/g by a Fourdrinier papermaking method. A CSF value of the thus obtained separator was 0 ml.

There was formed, by the use of the separator, an aluminum electrolytic capacitor element having a rated voltage of 16 V, a capacity of 550 µF, and an element outer diameter of 9.2 mm, and after impregnation with a GBL-based electrolytic solution, an aluminum electrolytic capacitor of Conventional Example 3 was produced by inserting the element in a casing and sealing the element.

Conventional Example 4

There was obtained, according to the method of Example 1 of JP 2003-158811 A, a separator having a thickness of 30.0 µm, a density of 0.333 g/cm³. A tear index, of the separator was large so as not to be able to be measured. Furthermore, since the separator is composed of a continuous long fiber, disaggregation is also impossible.

There was formed, by the use of the separator, an aluminum electrolytic capacitor element having a rated voltage of 16 V, a capacity of 550 µF, and an element outer diameter of 9.2 mm, and after impregnation with a GBL-based electrolytic solution, an aluminum electrolytic capacitor of Conventional Example 4 was produced by inserting the element in a casing and sealing the element.

In Conventional Example 4, the separator is fabricated by the use of cupra rayon being a cuprammonium regenerated cellulose fiber.

Example 6

There was used a papermaking raw material obtained by blending, as the fiber A, 40% by mass of a Lyocell fiber being a regenerated cellulose fiber having a CSF value of 80 ml, and as the fiber B, 60% by mass of a Lyocell fiber being a regenerated cellulose fiber having a CSF value of 500 ml in which the CSF value is once lowered to 0 ml (lower limit) and then turns upward by further beating, and thus there was obtained a separator having a thickness of 35.0 µm, a density of 0.400 g/cm³, and a tear index of 30 mN·m²/g by a Fourdrinier papermaking method. A CSF value of the thus obtained separator was 0 ml.

There was formed, by the use of the separator, an aluminum electrolytic capacitor element having a rated voltage of 50 V, a capacity of 150 µF and an element outer diameter of 9.5 mm, and after impregnation with a GBL-based electrolytic solution, an aluminum electrolytic capacitor of Example 6 was produced by inserting the element, in a casing and sealing the element.

Example 7

There was used a papermaking raw material obtained by blending, as the fiber A, 60% by mass of a Lyocell fiber being a regenerated cellulose fiber having a CSF value of 500 ml, and as the fiber B, 40% by mass of a Lyocell fiber being a regenerated cellulose fiber having a CSF value of 20 ml in which the CSF value is once lowered to 0 ml (lower limit) and then turns upward by further beating, and thus there was obtained a sheet by a Fourdrinier papermaking method. Subsequently, the sheet was subjected to calendaring processing to give a separator having a thickness of 35.0 µm, a density of 0.486 g/cm³, and a tear index of 43 mN·m²/g. A CSF value of the thus obtained separator was 36 ml.

There was formed, by the use of the separator, an aluminum electrolytic capacitor element having a rated voltage of 50 V, a capacity of 150 µF, and an element outer diameter of 9.5 mm, and after impregnation with a GBL-based electrolytic solution, an aluminum electrolytic capacitor of Example 7 was produced by inserting the element in a casing and sealing the element.

Example 8

There was obtained, by the use of the same papermaking raw material as in Example 7 and by a cylinder paper method, a separator having a thickness of 40.0 µm, a density of 0.375 g/cm³, and a tear index of 82 mN·m²/g. A CSF value of the. thus obtained separator was 56 ml.

There was formed, by the use of the separator, an aluminum electrolytic capacitor element having a rated voltage of 50 V, a capacity of 150 µF, and an element outer diameter of 9.6 mm, and after impregnation with a GBL-based electrolytic solution, an aluminum electrolytic capacitor of Example 8 was produced by inserting the element in a casing and sealing the element.

Comparative Example 6

There was used a papermaking raw material obtained by blending, as the fiber A, 85% by mass of a Lyocell fiber being a regenerated cellulose fiber having a CSF value of 350 ml, and as the fiber B, 15% by mass of a Lyocell fiber being a regenerated cellulose fiber having a CSF value of 20 ml in which the CSF value is once lowered to 0 ml (lower limit) and then turns upward by further beating, and thus there was obtained a separator, having a thickness of 40.0 µm, a density of 0.425 g/cm³, and a tear index of 112 mN·m²/g by a cylinder papermaking method. A CSF value of the thus obtained separator was 190 ml.

There was formed, by the use of the separator, an aluminum electrolytic capacitor element having a rated voltage of 50 V, a capacity of 150 μF, and an element outer diameter of 9.8 mm, and after impregnation with a GBL-based electrolytic solution, an aluminum electrolytic capacitor of Comparative Example 6 was produced by inserting the element in a casing and sealing the element.

Comparative Example 7

There was used a papermaking raw material obtained by blending, as the fiber A, 15% by mass of a Lyocell fiber being a regenerated cellulose fiber having a CSF value of 0 ml, and as the fiber B, 85% by mass of a Lyocell fiber being a regenerated cellulose fiber having a CSF value of 340 ml in which the CSF value is once lowered to 0 ml (lower limit) and then turns upward by further beating, and thus there was obtained a separator having a thickness of 35.0 μm, a density of 0.400 g/cm$^3$, and a tear index of 12 mN·m$^2$/g by a Fourdrinier papermaking method. A CSF value of the thus obtained separator was 5 ml.

There was formed, by the use of the separator, an aluminum electrolytic capacitor element having a rated voltage of 50 V, a capacity of 150 μF, and an element outer diameter of 9.5 mm, and after impregnation with a GBL-based electrolytic solution, an aluminum electrolytic capacitor of Comparative Example 7 was produced by inserting the element in a casing and sealing the element.

Conventional Example 5

There was used a papermaking raw material obtained by blending, as the fiber A, 30% by mass of a conifer craft pulp fiber being a natural cellulose fiber having a CSF value of 500 ml, and as the fiber B, 70% by mass of a Lyocell fiber being a regenerated cellulose fiber having a CSF value of 200 ml in which the CSF value is once lowered to 0 ml (lower limit) and then turns upward by further beating, and thus there was obtained a separator having a thickness of 30.0 μm, a density of 0.400 g/cm$^3$, and a tear index of 20 mN·m$^2$/g by a Fourdrinier papermaking method. A CSF value of the thus obtained separator was 0 ml.

There was formed, by the use of the separator, an aluminum electrolytic capacitor element having a rated voltage of 50 V, a capacity of 150 μF, and an element outer diameter of 9.3 mm, and after impregnation with a GBL-based electrolytic solution, an aluminum electrolytic capacitor of Conventional Example 5 was produced by inserting the element in a casing and sealing the element.

Conventional Example 6

There was used a papermaking raw material obtained by blending, as the fiber A, 25 % by mass of an acrylate fiber being a synthetic fiber having a CSF value of 625 ml, and as the fiber B, 75% by mass of a Lyocell fiber being a regenerated cellulose fiber having a CSF value of 0 ml, and thus there was obtained a separator having a thickness of 35.0 μm, a density of 0.371 g/cm$^3$, and a tear index of 13 mN·m$^2$/ g by a Fourdrinier papermaking method. A CSF value of the thus obtained, separator was 5 ml.

There was formed, by the use of the separator, an aluminum electrolytic capacitor element having a rated voltage of 50 V, a capacity of 150 μF, and an element outer diameter of 9.5 mm, and after impregnation with a GBL-based electrolytic solution, an aluminum electrolytic capacitor of Conventional Example 6 was produced by inserting the element in a casing and sealing the element.

Example 9

There was used a papermaking raw material obtained by blending, as the fiber A, 80% by mass of a Lyocell fiber being a regenerated cellulose fiber having a CSF value of 400 ml, and as the fiber B, 20% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 40.0 μm, a density of 0.400 g/cm$^3$, and a tear index of 3.6 mN·m$^2$/g by a Fourdrinier papermaking method. A CSF value of the thus obtained separator was 140 ml.

There was formed, by the use of the separator, an aluminum electrolytic capacitor element having a rated voltage of 100 V, a capacity of 50 μF, and an element outer diameter of 11.1 mm, and after impregnation with an EG-based electrolytic solution, an aluminum electrolytic capacitor of Example 9 was produced by inserting the element in a casing and sealing the element.

Example 10

There was used a papermaking raw material obtained by blending, as the fiber A, 80% by mass of a Lyocell fiber being a regenerated cellulose fiber having a CSF value of 500 ml, and as the fiber B, 20% by mass of a Lyocell fiber being a regenerated cellulose fiber having a CSF value of 20 ml in which the CSF value is once lowered to 0 ml (lower limit) and then turns upward by further beating, and thus there was obtained a separator having a thickness of 40.0 μm, a density of 0.400 g/cm$^3$, and a tear index of 55 mN·m$^2$/g by a Fourdrinier papermaking method. A CSF value of the thus obtained separator was 260 ml.

There was formed, by the use of the separator, an aluminum electrolytic capacitor element having a rated voltage of 100 v, a capacity of 50 μF, and an element outer diameter of 11.1 mm, and after impregnation with an EG-based electrolytic solution, an aluminum electrolytic capacitor of Example 10 was produced by inserting the element in a casing and sealing the element.

Example 11

There was used a papermaking raw material obtained by blending, as the fiber A, 60% by mass of a Lyocell fiber being a regenerated cellulose fiber having a CSF value of 500 ml, and as the fiber B, 40% by mass of a Lyocell fiber being a regenerated cellulose fiber having a CSF value of 20 ml in which the CSF value is once lowered to 0 ml (lower limit) and then turns upward by further beating, and thus there was obtained a separator having a thickness of 40.0 μm, a density of 0.400 g/cm$^3$, and a tear index of 43 mN·m$^2$/g by a Fourdrinier papermaking method. A CSF value of the thus obtained separator was 56 ml.

There was formed, by the use of the separator, an aluminum electrolytic capacitor element having a rated voltage of 100 V, a capacity of 50 μF, and an element outer diameter of 11.1 mm, and after impregnation with an EG-based electrolytic solution, an aluminum electrolytic capacitor of Example 11 was produced by inserting the element in a casing and sealing the element.

Example 12

There was obtained by the use of the same papermaking raw material as in the separator of Example 9, a separator having a thickness of 45.0 μm, a density of 0.356 g/cm³, and a tear index of 58 mN·m²/g by a cylinder paper method. A CSF value of the thus obtained separator was 140 ml.

There was formed, by the use of the separator, an aluminum electrolytic capacitor element having a rated voltage of 100 V, a capacity of 50 μF, and an element outer diameter of 11.2 mm, and impregnation with an EG-based electrolytic solution, an aluminum electrolytic capacitor of Example 12 was produced by inserting the element in a casing and sealing the element.

Example 13

There was obtained, by the use of the same papermaking raw material as in the separator of Example 10, a separator having a thickness of 45.0 μm, a density of 0.378 g/cm³, and a tear index of 98 mN·m² by a cylinder paper method. A CSF value of the thus obtained separator was 260 ml.

There was formed, by the use of the separator, an aluminum electrolytic capacitor element having a rated voltage of 100 V, a capacity of 50 μF, and an element outer diameter of 11.2 mm, and after impregnation with an EG-based electrolytic solution, an aluminum electrolytic capacitor of Example 13 was produced by inserting the element in a casing and sealing the element.

Comparative Example 8

There was used a papermaking raw material obtained by blending, as the fiber A, 70% by mass of a Lyocell fiber being a regenerated cellulose fiber having a CSF value of 620 ml, and as the fiber B, 3.0% by mass of a Lyocell fiber being a regenerated cellulose fiber having a CSF value of 10 ml in which the CSF value is once lowered to 0 ml (lower limit) and then turns upward by further beating, and thus there was obtained a separator having a thickness of 45.0 μm, a density of 0.367 g/cm³, and a tear index of 105 mN·m²/g by a cylinder papermaking method. A CSF value of the thus obtained separator was 120 ml.

There was formed, by the use of the separator, an aluminum electrolytic capacitor element having a rated voltage of 100 V, a capacity of 50 μF, and an element outer diameter of 11.2 mm, and after impregnation with an EG-based electrolytic solution, an aluminum electrolytic capacitor of Comparative Example 8 was produced by inserting the element in a easing and sealing the element.

Conventional Example 7

A sheet was obtained by the use of a Lyocell fiber being a regenerated cellulose fiber having a CSF value of 200 ml as the papermaking raw material and by a cylinder papermaking method. Subsequently, according to the method of Example 1 of JP 2006-253728 A, the sheet was subjected to paper strengthening processing to give a separator having a thickness of 40.0 μm, a density of 0.325 g/cm³, and a tear index of 107 mN·m²/g. A CSF value of the thus obtained separator was 200 ml.

There was formed, by the use of the separator, an aluminum electrolytic capacitor element having a rated voltage of 100 V, a capacity of 50 μF, and an element outer diameter of 11.1 mm, and after impregnation with an EG-based electrolytic solution, an aluminum electrolytic capacitor of Conventional Example 7 was produced by inserting the element in a casing and sealing the element.

Example 14

There was used a papermaking raw material obtained by blending, as the fiber A, 70% by mass of a Lyocell fiber being a regenerated cellulose fiber having a CSF value of 500 ml, and as the fiber B, 30% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 50.0 μm, a density of 0.300 g/cm³, and a tear index of 48 mN·m²/g by a Fourdrinier papermaking method. A CSF value of the thus obtained separator was 95 ml.

There was formed, by the use of the separator, an aluminum electrolytic capacitor element having a rated voltage of 200 V, a capacity of 120 μF, and an element outer diameter of 15.5 mm, and after impregnation with an EG-based electrolytic solution, an aluminum electrolytic capacitor of Example 14 was produced by inserting the element in a casing and sealing the element.

Comparative Example 9

There was used a papermaking raw material obtained by blending, as the fiber A, 80% by mass of a Lyocell fiber being a regenerated cellulose fiber having a CSF value of 550 ml, and as the fiber B, 20% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 55.0 μm, a density of 0.364 g/cm³, and a tear index of 17 mN·m²/g by a Fourdrinier papermaking method. A CSF value of the thus obtained separator was 120 ml.

There was formed, by the use of the separator, an aluminum electrolytic capacitor element having a rated voltage of 200 V, a capacity of 120 μF, and an element outer diameter of 15.7 mm and after impregnation with an EG-based electrolytic solution, the element was tried to be inserted in a casing, but was not able to be inserted in a case having the same size as that of Example 14 because of a large element outer diameter. Accordingly, there was produced an aluminum electrolytic capacitor of Comparative Example 3 by insertion of the element in a casing having a size larger than that of Example 14.

Conventional Example 8

According to the method of Example 1 of JP 53-142652 A, there was obtained a separator having a thickness of 60.0 μm, a density of 0.600 g/cm³, and a tear index of 35 mN·m²/g by a cylinder paper method. A CSF value of the thus obtained separator was 450 ml.

There was formed, by the use of the separator, an aluminum electrolytic capacitor element having a rated voltage of 200 V, a capacity of 120 μF, and an element outer diameter of 15.9 mm, and after impregnation with an EG-based electrolytic solution, the element was tried to be inserted in a casing, but was not able to be inserted in a case having the same size as that of Example 14 because of a large element outer diameter. Accordingly, there was produced an aluminum electrolytic capacitor of Conventional Example 8 by insertion of the element in a casing having a size larger than that of Example 14.

Conventional Example 9

According to the method of Example 2 of JP H6-168848 A, there was obtained a separator having a thickness of 40.0 μm, a density of 0.638 g/cm³, and a tear index of 14 mN·m²/g, and having a high density layer with a thickness of 25.0 μm and a density of 0.800 g/cm³; and a low density layer with a thickness of 15.0 μm and a density of 0.367 g/cm³. A CSF value of the thus obtained separator was 0 ml.

There was formed, by the use of the separator, an aluminum electrolytic capacitor element having a rated voltage of 200 V, a capacity of 120 μF, and an element outer diameter of 15.2 mm, and after impregnation with an EG-based electrolytic solution, an aluminum electrolytic capacitor of Conventional Example 9 was produced by inserting the element in a casing and sealing the element.

Example 15

There was used a papermaking raw material obtained by blending, as the fiber A, 80% by mass of a Lyocell fiber being a regenerated cellulose fiber having a CSF value of 200 ml, and as the fiber B, 20% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 35.0 μm, a density of 0.457 g/cm³, and a tear index of 20 mN·m²/g by a Fourdrinier papermaking method. A CSF value of the thus obtained separator was 60 ml.

There was formed, by the use of two separators between the two electrodes, an aluminum electrolytic capacitor element having a rated voltage of 450 V, a capacity of 50 μF, and an element outer diameter of 17.6 mm, and after impregnation with a GBL-based electrolytic solution, an aluminum electrolytic capacitor of Example 15 was produced by inserting the element in a casing and sealing the element.

Comparative Example 10

There was used a papermaking raw material obtained by blending, as the fiber A, 80% by mass of a Lyocell fiber being a regenerated cellulose fiber having a CSF value of 550 ml, and as the fiber B, 20% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 70.0 μm, a density of 0.300 g/cm³, and a tear index of 28 Nm·m²/g by a Fourdrinier papermaking method. A CSF value of the thus obtained separator was 200 ml.

There was formed, by the use of the separator, an aluminum electrolytic capacitor element having a rated voltage of 450 V, a capacity of 50 μF, and an element outer diameter of 17.6 mm, and after impregnation with a GBL-based electrolytic solution, an aluminum electrolytic capacitor of Comparative Example 10 was produced by inserting the element in a casing and sealing the element.

Comparative Example 11

There was used a papermaking raw material obtained by blending, as the fiber A, 80% by mass of a Lyocell fiber being a regenerated cellulose fiber having a CSF value of 620 ml, and as the fiber B, 20% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 80.0 μm, a density of 0.400 g/cm³, and a tear index of 50 mN·m²/g by a Fourdrinier papermaking method. A CSF value of the thus obtained separator was 310 ml.

There was formed, by the use of the separator, an aluminum electrolytic capacitor element having a rated voltage of 450 V, a capacity of 50 μF, and an element outer diameter of 17.9 mm, and after impregnation with a GBL-based electrolytic solution, an aluminum electrolytic capacitor of Comparative Example 11 was produced by inserting the element in a casing and sealing the element.

Comparative Example 12

There was obtained, by the use of the same papermaking raw material as in the separator of Comparative Example 11, a separator having a thickness of 80.0 μm, a density of 0.400 g/cm³, and a tear index of 95 mN·m²/g by a cylinder paper method. A CSF value of the thus obtained separator was 310 ml.

There was formed, by the use of the separator, an aluminum electrolytic capacitor element having a rated voltage of 450 V, a capacity of 50 μF, and an element outer diameter of 17.9 mm, and after impregnation with a GBL-based electrolytic solution, an aluminum electrolytic capacitor of Comparative Example 12 was produced by inserting the element in a casing and sealing the element.

Conventional Example 11

According to the method of Example 1 of JP 53-142652 A, there was obtained a separator having a thickness of 90.0 μm, a density of 0.600 g/cm³, and a tear index of 35 mN·m²/g by a cylinder paper method. A CSF value of the thus obtained separator was 450 ml.

There was formed, by the use of the separator, an aluminum electrolytic capacitor element having a rated voltage of 450 V, a capacity of 50 μF, and an element outer diameter of 18.2 mm, and after impregnation with an EG-based electrolytic solution, the element was tried to be inserted in a casing, but was not able to be inserted in a case having the same size as that of Example 15 or as that each of Comparative Examples 9 to 11 because of a large element outer diameter. Accordingly, there was produced an aluminum electrolytic capacitor of Conventional Example 11 by insertion of the element in a casing having a size larger than that of Example 14.

As described above, according to the aforementioned present embodiments, when the fiber A that enhances the tearing strength and the fiber B that enhances the denseness are blended, and the fiber A and the fiber B are composed of the regenerated cellulose fibers, and the blending ratio of the fiber A is 20 to 80% and the blending ratio of the fiber B is 20 to 80%, it is possible to provide a separator having the CSF value X and the tear index Y of the separator which satisfy the ranges of the following formulae.

| | |
|---|---|
| $0 \leq X \leq 300$ | Formula 1 |
| $15 \leq Y \leq 100$ | Formula 2 |
| $Y \geq 0.175X - 2.5$ | Formula 3 |

In Table 1, there are shown the evaluation results of the properties of the separator itself and the performances of the aluminum electrolytic capacitor, as to Examples 1 to 15 of the present embodiment, Comparative Examples 1 to 12 and Conventional Examples 1 to 11.

In Table 3, in order to distinguish the degree of beating, the CPS value in which the CSF value is once lowered to 0 ml (lower limit) and then turns upward by further beating is represented by indicating a symbol *. In the case of the aluminum electrolytic capacitor obtained by insertion of two separators between two electrodes, the thickness of the separator is represented by "thickness value of one sheet×2". Each of the various measurement values is an average value of a plurality of the samples.

TABLE 1

| | Blend of separator | | | | | | | Properties of separator | | | Performances of capacitor | | | | |
|---|---|---|---|---|---|---|---|---|---|---|---|---|---|---|---|
| | Fiber A | | | Fiber B | | | | Specific tear | | Den- | Rated | | | Break- | Short |
| | Name of fiber | Blend amount % | CSF ml | Name of fiber | Blend amount % | CSF ml | Sheet CSF ml | strength nN·m²/g | Thick-ness μm | sity g/cm³ | volt-age V | Capa-city μF | age defect rate % | Impe-dance Ω/100 kHz | circuit defect rate % |
| Example 1 | Lyocell | 20 | 0 | Lyocell | 80 | *500 | 10 | 17 | 10.0 | 0.400 | 6.3 | 1000 | 0.4 | 0.110 | 0.4 |
| Example 2 | Lyocell | 50 | 0 | Lyocell | 50 | *350 | 0 | 27 | 20.0 | 0.450 | 6.3 | 1000 | 0.2 | 0.120 | 0.2 |
| Example 3 | Lyocell | 50 | 0 | Lyocell | 50 | *350 | 0 | 52 | 40.0 | 0.400 | 6.3 | 1000 | 0.0 | 0.140 | 0.5 |
| Comparative Example 1 | Lyocell | 50 | 10 | Lyocell | 50 | *350 | 0 | 13 | 9.0 | 0.422 | 6.2 | 1000 | 1.1 | 0.100 | 8.5 |
| Comparative Example 2 | Lyocell | 50 | 10 | Lyocell | 50 | *350 | 0 | 13 | 16.0 | 0.238 | 6.3 | 1000 | 1.1 | 0.100 | 8.0 |
| Conventional Example 1 | — | — | — | Lyocell | 100 | *160 | 150 | 6 | 20.0 | 0.425 | 6.3 | 1000 | 1.1 | 0.120 | 0.0 |
| Conventional Example 2 | Esparto manila hemp | 100 | 620 | — | — | — | 620 | 43 | 40.0 | 0.400 | 6.3 | 1000 | 0.0 | 0.400 | 11.5 |
| Example 4 | Polynosic rayon | 20 | 0 | Polynosic rayon | 80 | *1 | 0 | 17 | 25.0 | 0.540 | 16 | 550 | 0.2 | 0.125 | 0.3 |
| Example 5 | Lyocell | 30 | 100 | Lyocell | 70 | *20 | 0 | 24 | 30.0 | 0.400 | 16 | 550 | 0.1 | 0.120 | 0.2 |
| Comparative Example 3 | Lyocell | 40 | *20 | Lyocell | 60 | *80 | 55 | 5 | 30.0 | 0.400 | 16 | 550 | 3.0 | 0.125 | 0.0 |
| Comparative Example 4 | Lyocell | 20 | 30 | Lyocell | 80 | 5 | 20 | 105 | 35.0 | 0.371 | 16 | 550 | 0.0 | 0.130 | 2.2 |
| Comparative Example 5 | Lyocell | 80 | 0 | Lyocell | 20 | *680 | 0 | 105 | 35.0 | 0.400 | 16 | 550 | 0.0 | 0.120 | 2.0 |
| Conventional Example 3 | Lyocell | 100 | 0 | — | — | — | 0 | 7 | 30.0 | 0.400 | 16 | 550 | 11.0 | 0.120 | 0.4 |
| Conventional Example 4 | Cupra | 100 | — | — | — | — | — | Unmeas-urable | 30.0 | 0.333 | 16 | 550 | 0.0 | 0.115 | 10.0 |
| Example 6 | Lyocell | 40 | 80 | Lyocell | 60 | *500 | 0 | 30 | 35.0 | 0.400 | 50 | 150 | 0.3 | 0.130 | 0.1 |
| Example 7 | Lyocell | 60 | 500 | Lyocell | 40 | *20 | 56 | 43 | 35.0 | 0.486 | 50 | 150 | 0.2 | 0.140 | 0.1 |
| Example 8 | Lyocell | 60 | 500 | Lyocell | 40 | *20 | 56 | 82 | 40.0 | 0.375 | 50 | 150 | 0.0 | 0.135 | 0.3 |
| Comparative Example 6 | Lyocell | 85 | 350 | Lyocell | 15 | *20 | 190 | 112 | 40.0 | 0.425 | 50 | 150 | 0.0 | 0.145 | 1.1 |
| Comparative Example 7 | Lyocell | 15 | 0 | Lyocell | 85 | *340 | 5 | 12 | 35.0 | 0.400 | 50 | 150 | 1.2 | 0.133 | 0.0 |
| Conventional Example 5 | Conifer | 30 | 500 | Lyocell | 70 | *200 | 0 | 20 | 30.0 | 0.400 | 50 | 150 | 1.0 | 0.200 | 0.4 |
| Conventional Example 6 | Acrylate | 25 | 625 | Lyocell | 75 | 0 | 5 | 13 | 35.0 | 0.371 | 50 | 150 | 1.2 | 0.123 | 1.1 |
| Example 9 | Lyocell | 80 | 400 | Lyocell | 20 | *1 | 140 | 30 | 40.0 | 0.400 | 100 | 50 | 0.2 | 0.265 | 0.2 |

TABLE 1-continued

| | Blend of separator | | | | | | Properties of separator | | | Performances of capacitor | | | | |
|---|---|---|---|---|---|---|---|---|---|---|---|---|---|---|
| | Fiber A | | | Fiber B | | | Specific tear | | Density | Rated | | Breakage | Impe- | Short circuit |
| | Name of fiber | Blend amount % | CSF ml | Name of fiber | Blend amount % | CSF ml | Sheet CSF ml | strength nN·m²/g | Thickness μm | g/cm³ | voltage V | Capacity μF | defect rate % | dance Ω/100 kHz | defect rate % |
| Example 10 | Lyocell | 80 | 500 | Lyocell | 20 | *20 | 260 | 55 | 40.0 | 0.400 | 100 | 50 | 0.1 | 0.255 | 0.3 |
| Example 11 | Lyocell | 60 | 500 | Lyocell | 40 | *20 | 56 | 43 | 40.0 | 0.400 | 100 | 50 | 0.1 | 0.270 | 0.0 |
| Example 12 | Lyocell | 80 | 400 | Lyocell | 20 | *1 | 140 | 58 | 45.0 | 0.356 | 100 | 50 | 0 | 0.280 | 0.4 |
| Example 13 | Lyocell | 80 | 500 | Lyocell | 20 | *20 | 260 | 98 | 45.0 | 0.378 | 100 | 50 | 0 | 0.270 | 0.5 |
| Comparative Example 8 | Lyocell | 70 | 620 | Lyocell | 30 | *10 | 120 | 105 | 45.0 | 0.367 | 100 | 50 | 0 | 0.265 | 1.1 |
| Conventional Example 7 | Lyocell | 100 | 200 | — | — | — | 200 | 107 | 40.0 | 0.325 | 100 | 50 | 0 | 0.245 | 1.4 |
| Example 14 | Lyocell | 70 | 500 | Lyocell | 30 | *1 | 95 | 48 | 50.0 | 0.300 | 200 | 120 | 0.1 | 0.440 | 0.2 |
| Comparative Example 9 | Lyocell | 80 | 550 | Lyocell | 20 | *1 | 120 | 17 | 55.0 | 0.364 | 200 | 120 | 1.9 | 0.480 | 0.2 |
| Conventional Example 8 | Esparto manila hemp | 100 | 450 | — | — | — | 450 | 35 | 60.0 | 0.600 | 200 | 120 | 0 | 0.880 | 15.2 |
| Conventional Example 9 | Esparto mercerized broad-leaved tree | 22 | 680 | Conifer | 78 | 0 | 0 | 14 | 40.0 | 0.638 | 200 | 120 | 2.5 | 2.110 | 0.0 |
| Example 15 | Lyocell | 80 | 200 | Lyocell | 20 | *1 | 60 | 20 | 35.0 × 2 | 0.457 | 450 | 50 | 0.7 | 0.052 | 0.1 |
| Comparative Example 10 | Lyocell | 80 | 550 | Lyocell | 20 | *1 | 220 | 28 | 70.0 | 0.300 | 450 | 50 | 1 | 0.050 | 0.2 |
| Comparative Example 11 | Lyocell | 80 | 620 | Lyocell | 20 | *1 | 310 | 50 | 80.0 | 0.400 | 450 | 50 | 0 | 0.049 | 1.1 |
| Comparative Example 12 | Lyocell | 80 | 620 | Lyocell | 20 | *1 | 310 | 95 | 80.0 | 0.400 | 450 | 50 | 0 | 0.048 | 18.0 |
| Conventional Example 11 | Esparto manila hemp | 100 | 450 | — | — | — | 450 | 35 | 90.0 | 0.600 | 450 | 50 | 0 | 0.140 | 16.0 |

Hereinafter, evaluation results will be explained with respect to each of Examples, Comparative Examples and Conventional Examples.

The aluminum electrolytic capacitors fabricated by the use of the separators of Examples 1 to 3 have the breakage defect rates as low as 0.8 to 0.4% which are below 1%. Furthermore, the short circuit defect rates are as low as 0.2 to 0.5% which are below 1%. Moreover, the impedances are also sufficiently as low as 0.110 to 0.140 Ω.

On the other hand, since the thickness of the separator of Comparative Example 1 is as small as 9.0 μm, the breakage defect rate is as high as 1.1% and the short circuit defect rate is as high as 8.5%. Accordingly, it can be seen that the thickness of the separator is preferably 10 μm or more.

In addition, since the density of the separator of Comparative Example 2 is as low as 0.238 g/cm², the breakage defect rate is as high as 1.1% and the short circuit defect rate is as high as 8.0%. Accordingly, it can be seen that the density of the separator is preferably 0.25 g/cm³ or more.

Additionally, the separator of Conventional Example 1 uses, as the raw material, only the Lyocell fiber having a CSF value of 160 ml in which the CSF value is once lowered to 0 ml (lower limit) and then turns upward by further beating. Accordingly, the tear index of the separator is as low as 6 mN·m²/g which is below the range of the Formula 2, and the breakage defect rate is as high as 1.1%.

Furthermore, since the CSF value of the separator of Conventional Example 2 is as high as 620 ml. Accordingly, the denseness of the separator is low, and thus the short circuit defect rate is as high as 11.5%. Moreover, since the separator is composed of only a natural fiber, the impedance becomes worse than Example 1 by three times or more.

The aluminum electrolytic capacitors fabricated by the use of the separators of Examples 4 and 5 have the breakage defect rates as low as 0.1 to 0. 2% which are below 1%. Furthermore, the short circuit defect rates are as low as 0.2 to 0.3% which are below 1 %. Moreover, the impedances are sufficiently as low as 0.120 to 0.125 Ω.

The fiber A of the separator of Comparative Example 3 has a CSF value of 20 ml in which the CSF value is once lowered to 0 ml (lower limit) and then turns upward by further beating. Accordingly, the tear index of the separator is below the range of the Formula 2, and the breakage defect rate is as high as 3.0%.

The fiber B of the separator of Comparative Example 4 has a CSF value of 5 ml. and the degree of beating is low. Therefore, the tear index of the separator exceeds the range of the Formula 2, and the denseness of the separator is low. Thus, the short circuit defect rate of the aluminum electrolytic capacitor is as high as 2.2%.

The fiber B of the separator of Comparative Example 5 has a CSF value of 680 ml in which the CSF value is once lowered to 0 ml (lower limit) and then turns upward by further beating. Therefore, during the papermaking steps of the separator, the micronized fibers in the fiber B fall off from a papermaking wire. As a result, the tear index of the separator of Comparative Example 5 exceeds the range of the Formula 2, and the short circuit defect rate is as high as 2.0%.

The tear index of the separator of Conventional Example 3 is below the range of the Formula 2, and the breakage defect rate is as high as 11.0%. Although the CSF value of the separator of Conventional Example 3 is 0 ml, which is the same as each of the CSF values of the separators of Example 4 and Example 5, the breakage defect rate and the short circuit defect rate of Example 4 and Example 5 are both more excellent than in Conventional Example 3. Accordingly, the separator obtained by mixing materials having different degrees of beating according to the present invention rather than materials that are singly beaten, can enhance both of the denseness and the tearing strength, with the result that it can be seen that both of the breakage defect rate and the short circuit defect rate of the aluminum electrolytic capacitor can be reduced.

The separator of Conventional Example 4 is a regenerated cellulose separator sheet-formed by the wet spunbond method, and the tear index is unmeasurably high. Accordingly, the breakage defect was not generated. However, the short circuit defect rate of the aluminum electrolytic capacitor of Conventional Example 4 is as high as 10.0%. The reason thereof is that a sheet formed by the spunbond method becomes easily non-uniform and is lack in denseness in comparison with a sheet formed by the papermaking method.

Furthermore, according to Conventional Example 4, since the separator is fabricated by the use of the cupra rayon being the cuprammonium regenerated cellulose fiber, the separator contains a copper ion in the fiber. Accordingly, when the aluminum electrolytic capacitor that uses a separator obtained by the use of the cupra rayon is used for a long period of time, there is a concern that a copper ion is precipitated inside the capacitor to thereby generate the short circuit detect.

The aluminum electrolytic capacitors manufactured by the use of the separators of Example 6 to Example 8 have the breakage defect rates as low as 0.0 to 0.3% which are below 1%. Furthermore, the short circuit defect rates are as low as 0.1 to 0.3% which are below 1% . Moreover, the impedances are also sufficiently as low as 0.130 to 0.140 Ω.

The separator of Example 7 is obtained by the use of the same papermaking raw material as Example 8 and by the Fourdrinier papermaking method. The separator of Example 7 satisfies the Formula 4, but the separator of Example 8 does not satisfy the Formula 4. The short circuit defect rate of the capacitor of Example 7 is below that of each of the capacitors of Example 7 and Example 8. Accordingly, it can be seen that when the capacitor satisfies not only the formulae 2 and the Formula 3 but also the Formula 4, the short circuit defect rate can be further reduced.

The separator of Comparative Example 6 is obtained by blending 85% by mass of the fiber A and 15% by mass of the fiber B, and the tear index exceeds the range of the Formula 2. In addition, the short circuit defect rate of the aluminum electrolytic capacitor of Comparative Example 6 becomes as high as 1.1%. The reason thereof is considered that since the proportion of the fiber B is small, the denseness is not enhanced.

The separator of Comparative Example 7 is obtained by blending 15% by mass of the fiber A and 85% by mass of the fiber B, and the tear index is below the range of the Formula 2. In addition, the breakage defect rate of the aluminum electrolytic capacitor of Comparative Example 7 is as high as 1.2%. The reason thereof is considered that the proportion of the fiber A that enhances the tearing strength is small.

In Conventional Example 5, there is blended, as the fiber A, the conifer craft pulp having a CSF value of 500 ml, and as the fiber B, the regenerated, cellulose fiber having a CSF value of 200 ml in which the CSF value is once lowered to 0 ml (lower limit) and then turns upward by further beating. In comparison with Example 6 to Example 8, due to the influence of the conifer craft pulp, the value of impedance is as high as 0.200 Ω which is higher than each of those in Example 6 to Example 8 by 30% or more.

Conventional Example 6 is the separator obtained by blending the acrylate fiber, and the tear index is as low as 13 mN·m$^2$/g which is below the range of the Formula 2 . The reason thereof is that the bonding power between the fibers is lowered since the synthetic fiber is blended. In addition, for the same reason, the barrier property of the separator is lowered, and the breakage defect rate and the short circuit defect rate become as high as 1.2% and 1.1%, respectively.

The aluminum electrolytic capacitors fabricated by the use of the separators of Example 9 to Example 13 have the breakage defect rates as low as 0.0 to 0.2% which are below 1%. In addition, the short circuit defect rates are as low as 0.0 to 0.5% which are below 1%. Furthermore, the impedances are also sufficiently as low as 0.255 to 0.280 Ω.

The impedance of each of the aluminum electrolytic capacitors of Example 3 to Example 13 becomes slightly higher than that of Conventional Example 7. However, since the expected ranges of the impedance of the aluminum electrolytic capacitor depend on the performances of the capacitor such as the rated voltage and capacity, the values of impedance of Example 9 to Example 13 are also sufficient for the aluminum electrolytic capacitor of the rated voltage of 100 V and the capacity of 50 μF.

The short circuit defect rate of the aluminum electrolytic fabricated by the use of the separator of Example 9 is slightly lower than that in Example 12. The short circuit defect rate of the aluminum electrolytic capacitor fabricated by the use of the separator of Example 10 is slightly lower than that in Example 13. This is due to the same reason as in Example 7 and Example 8, and it can be seen that the separator that satisfies not only the Formula 2 and the Formula 3 but also the Formula 4 is more preferable from the viewpoint of improvement of the short circuit defect rate.

The short circuit defect rate of the aluminum electrolytic capacitor fabricated by the use of the separator of Example 11 is slightly lower than that in Example 9. Accordingly, it can be seen that the separator that satisfies not only the range of the Formula 1 but also the range of the Formula 5 is more preferable from the viewpoint of improvement of the short circuit defect rate.

The tear index of the separator of Comparative Example 8 is as large as 105 mN·m²/g which is larger than the range of the Formula 2. This is caused by the low degree of beating of the fiber and thus the short circuit defect rate is as high as 1.1%.

The separator of Conventional Example 7 is the separator formed by papermaking by the use of the raw material which is obtained by singly beating the regenerated cellulose fiber and which has the CSF value of 200 ml. Since the CSF value of the regenerated cellulose fiber is large, the tearing strength is extremely high, resulting in no breakage defect. However, since the tear index exceeds the range of the Formula 2, the short circuit defect rata is as high as 1.4%.

The aluminum electrolytic capacitor fabricated by the use of the separator's of Example 14 has the breakage defect rate as low as 0.1% which is below 1%. In addition, the short circuit defect rate is as low as 0.1% which is below 1%. Furthermore, the impedance is also sufficiently as low as 0.440 Ω.

The tear index of the separator of Comparative Example 9 is as low as 17 mN·m²/g which is below the range of the Formula 3. Accordingly, the breakage defect rate becomes as high as 1.9%. Furthermore, since the thickness is larger than the separator of Example 14 and the element outer diameter is larger, the separator is inserted into the casing larger than the size Of Example 14. Accordingly, it can be seen that, in order to pursue down-sizing, the thickness is preferably 50 μm or less.

Since the thickness of the separator of Conventional Example 8 is larger than that of the separator of Example 14 and the element outer diameter is larger than that of Example 14, the element is inserted into the casing larger than the size of Example 14. Furthermore, the CSF value of the separator is as high as 450 ml. Accordingly, the denseness of the separator is low, and the short circuit defect becomes as high as 15.2%. Moreover, the separator is composed of only a natural fiber, and the impedance becomes worse by twice of Example 14. It can be seen from the example that, when the separator according to the present embodiment is used, even if the separator having a smaller thickness than the conventional separator is adopted, the short circuit defect is not increased, and at the same time, the element can be down-sized.

The separator of Conventional Example 9 has a layer of a natural fiber having a high degree of beating. Accordingly, although the short circuit defect is not generated, the impedance performance is degraded as large as 2.110 Ω. Since both of the fiber A and the fiber B have weak resistance to the drawing of the fiber, the value of the tear index is also small, and the breakage defect rate is also as high as 2.5%.

The aluminum electrolytic capacitor fabricated by the use of the separators of Example 15 has the breakage detect rate ae low as 0.7% which is below 1%. In addition, the short circuit defect rate is as low as 0.1% which is below 1%. Furthermore, the impedance is also sufficiently as low as 0.052 Ω.

The tear index of the separator of Comparative Example 10 is as low as 28 mN·m²/g which is below the range of the Formula 3. Therefore, the breakage defect rate becomes as high as 1.0%.

The CSF values of the separators of Comparative Example 11 and Comparative Example 12 are 310 ml that exceeds the range of the Formula 1. Accordingly, the breakage defect rates thereof are both as high as 1% or more.

Since the thickness of the separator of Conventional Example 11 is larger than the separator of Example 15 and the element outer diameter is larger, the separator is inserted into the casing larger than the size of Example 15. Furthermore, the CSF value of the separator is as high as 450 ml. Accordingly, the denseness of the separator is low, and the short circuit defect is as high as 16.0%. Moreover, the separator is composed of only a natural fiber, and the impedance becomes worse by twice of Example 15. It can be seen from the example that, when the separator according to the present embodiment is used, even if the separator having a smaller thickness than the conventional separator is adopted, the short circuit defect is not increased, and at the same time, the element can be down-sized.

Figure 2:
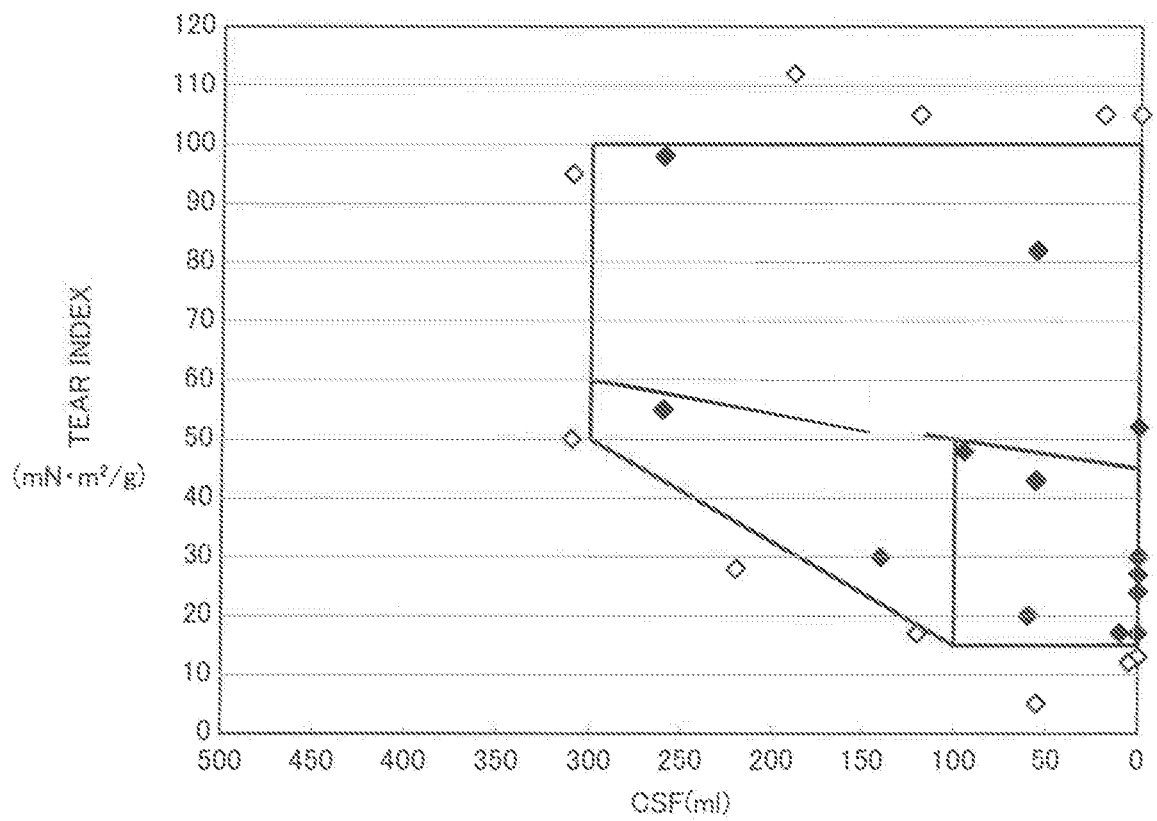
FIG. 2 is a graph in which the CSF values and the tear index of the separator are plotted with respect to each example of Examples and Comparative Examples.

Furthermore, with respect to each of Examples and Comparative Examples, the CSF value of the separator and the tear index are plotted in FIG. 2. In FIG. 2, the lines of boundaries in the range of the formulae 1 to the Formula 5 are shown together with plotting of values in each Example.

From FIG. 2, each Example is within the ranges of the Formula 1 to the Formula 3, but each comparative Example is outside of at least one range of the Formula 1 to the Formula 3.

Moreover, in a case of making a comparison among the capacitors having the same rated voltage and capacity, the short circuit defect rate is more reduced when not only the Formula 1 to the Formula 3 are satisfied, but also the Formula 4 is satisfied at the same time.

Furthermore, when the Formula 5 is satisfied at the same time, the short circuit defect rate is further reduced.

According to the aforementioned present embodiment, when the fiber A that enhances the tearing strength and the fiber B that enhances the denseness are beaten to the ranges shown below, and the fiber A and the fiber B are the regenerated cellulose fibers, and the blending ratio oil the fiber A is 20 to 80% by mass and the blending ratio of the fiber B is 20 to 80% by mass, it is possible to provide the separator having the CSF value X and the tear index of the separator which satisfy the ranges of the following formulae. In addition, when the thickness of the separator is 10 to 50 μm, and the density is 0.25 to 0.70 g/cm³, it is possible to provide the aluminum electrolytic capacitor having an excellent impedance performance, denseness and tearing strength.

CSF value of Fiber A; CSF value 500 to 0 ml

CSF value of Fiber 3: CSF value of 1 to 500 ml in which the CSF value reaches 0 ml (lower limit) for the moment and then goes up by further beating $$0 \leq X \leq 300 \quad \text{Formula 1}$$

$$15 \leq Y \leq 100 \quad \text{Formula 2}$$

$$Y \geq 0.175X - 2.5 \quad \text{Formula 3}$$

By the use of the aforementioned separator, it is possible to provide the aluminum electrolytic capacitor having an excellent impedance performance, and capable of improving short circuit defect rate and also enhancing yield in the production step of the aluminum electrolytic capacitor.

In the above, there have been explained the examples where the separator of the present embodiment is used for the aluminum electrolytic capacitor.

Although detailed explanation as to the other configuration and production steps of the aluminum electrolytic capacitor is eliminated, in the aluminum electrolytic capacitor of the present invention, materials for the electrodes and materials for the electrolytic solution are not particularly limited, and various materials can be used.

In the aforementioned present embodiment, the CSF value of the fiber A is CSF value of 500 to 0 ml, and the CSF value of the fiber B is CSF value of 1 to 500 ml in which the value is once lowered to 0 ml (lower limit) and then turns upward by further beating. In each Example, as the fiber A and the fiber B, there are used fibers fabricated from the same kind of the regenerated cellulose fiber but have different degrees of beating.

In the present invention, as long as the properties of the separator satisfy the Formula 1 to the Formula 3 at the same time, or satisfy the Formula 1 to the Formula 4 at the same time, or satisfy the Formula 1 to the Formula 5 at the same time, the composition of the beatable regenerated cellulose fiber constituting the separator is not particularly limited. As long the regenerated cellulose fiber satisfies the Formula 1 to the Formula 3 at the same time, or satisfy the Formula 1 to the Formula 4 at the same time, or satisfy the Formula 1 to the Formula 5 at the same time, for example, it is possible to use three or more regenerated cellulose fibers having different degrees of beat, or to use a regenerated cellulose fiber having a CSF value which is outside of the range of the CSF value of the present embodiment, or to use the fiber A and the fiber B which have different kinds of regenerated cellulose fibers.

Furthermore, as long as the element outer diameter is acceptable, it is possible to use a plurality of the separators of the present invention, or to use one or more separators of the present invention in a lamination manner.

INDUSTRIAL APPLICABILITY

The separator of the present invention is applicable to the aluminum electrolytic capacitor, and further applicable to various storage devices such as an electric double layer capacitor, a lithium ion capacitor, a lithium ion battery, a lithium battery, a sodium ion battery and a solid electrolytic capacitor.

The invention claimed is:

1. A separator using a mixed raw material of fibers A and fibers B, for an aluminum electrolytic capacitor, comprising:
    20 to 80% by mass of beatable regenerated cellulose fibers (fibers A) having a CSF value of 0 to 500 [ml] and
    20 to 80% by mass of beatable regenerated cellulose fibers (fibers B) having a CSF value of 1 to 500 [ml] which turns upward,
    wherein the separator is interposed between an anode and a cathode of an aluminum, electrolytic capacitor, and
    a CSF value X [ml] of the separator and a tear index Y [mN·m²/g] of the separator are within ranges satisfying Formulae 1 to 3 :

$0 \leq X \leq 300;$  Formula 1

$15 \leq Y \leq 100;$ and  Formula 2

$Y \geq 0.175X - 2.5.$  Formula 3

2. The separator according to claim 1, wherein the CSF value X and the tear index satisfy Formula 4:

$Y \leq 0.05X + 45.$  Formula 4.

3. The separator according to claim 2, wherein the CSF value X satisfies Formula 5:

$0 \leq X \leq 100.$  Formula 5

4. The separator according to claim 1, wherein a thickness of the separator is 10 to 50 μm.

5. The separator according to claim 1, wherein a density of the separator is 0.25 to 0.70 g/cm³.

6. An aluminum electrolytic capacitor, comprising the separator according to claim 1.

* * * * *